United States Patent

[11] 3,572,011

| [72] | Inventor | Gunnar Wilhelmsson<br>Vaxjo, Sweden |
|---|---|---|
| [21] | Appl. No. | 858,790 |
| [22] | Filed | Sept. 17, 1969 |
| [45] | Patented | Mar. 23, 1971 |
| [73] | Assignee | Aktiebolaget Svenska Flaktfabriken<br>Stockholm, Sweden |
| [32] | Priority | Sept. 20, 1968 |
| [33] | | Sweden |
| [31] | | 12,680 |

[54] FILTERING APPARATUS FOR GASEOUS MEDIA
3 Claims, 3 Drawing Figs.

[52] U.S. Cl. ............................................. 55/290,
55/291, 55/302, 55/337, 55/459, 55/468
[51] Int. Cl. ..................................................... B01d 50/00
[50] Field of Search ........................................... 55/290,
291, 293, 301, 302, 303, 418, 337, 459, 468;
210/304, 391, 393

[56] References Cited
UNITED STATES PATENTS

| 2,070,074 | 2/1937 | Young ........................ | 210/391 |
| 3,174,622 | 3/1965 | Lamont ...................... | 210/304 |
| 3,421,291 | 1/1969 | Messen-Jaschin ........... | 55/290 |

FOREIGN PATENTS

| 677,074 | 8/1952 | Great Britain ............... | 55/290 |
| 867,690 | 5/1961 | Great Britain ............... | 210/393 |

OTHER REFERENCES

German printed application 1,187,114—Lang dated 2—1965 1 sht. dwg.— 2 shts. spec. (A copy in 55—290)
German printed application 1,058,344— Trctzschler & Co. dated 5— 1959 2 shts. dwg.— 2 sht. spec. (A copy in 55—290)

Primary Examiner—Frank W. Lutter
Assistant Examiner—Bernard Nozick
Attorney—Howson and Howson ABSTRACT: Filtering apparatus having rotatably mounted filter drum with a cylindrical filter surface mounted within a volute casing whose inlet directs dirt-laden medium against the exterior of the filter surface and whose outlet withdraws clean medium from the interior of the drum. The suction nozzle has a suction gap directed toward the filter surface to remove foreign material therefrom. A rotatable roller is pivotally suspended to bear against the cylindrical surface in advance of the suction nozzle to follow the accumulation of foreign material on the filter surface, enlarging the suction gap when the material builds up and reducing it when the material is depleted. The nozzle is fixedly mounted adjacent the inlet of the volute casing and a plate is hinged to the casing and biased against the roller to deflect the incoming dirt-laden medium circumferentially of the drum and a similar plate is hinged to the nozzle and biased against the roller to permit movement of the roller changing the opening of the slot. Blow nozzles are also provided to blow gaseous medium between the nozzle and the cylindrical surface to assist in the loosening of the foreign material from the surface for removal by the suction nozzle.

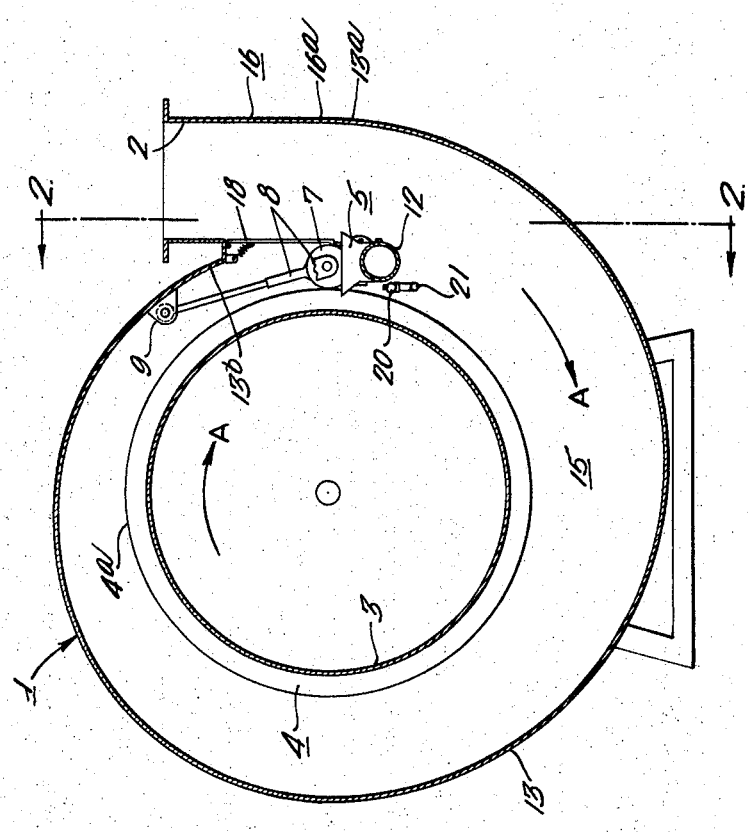
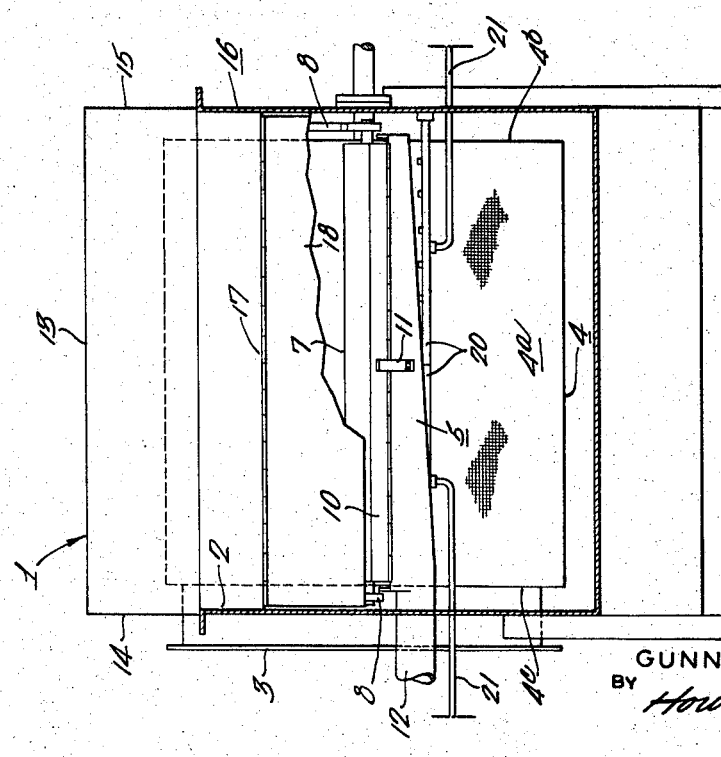

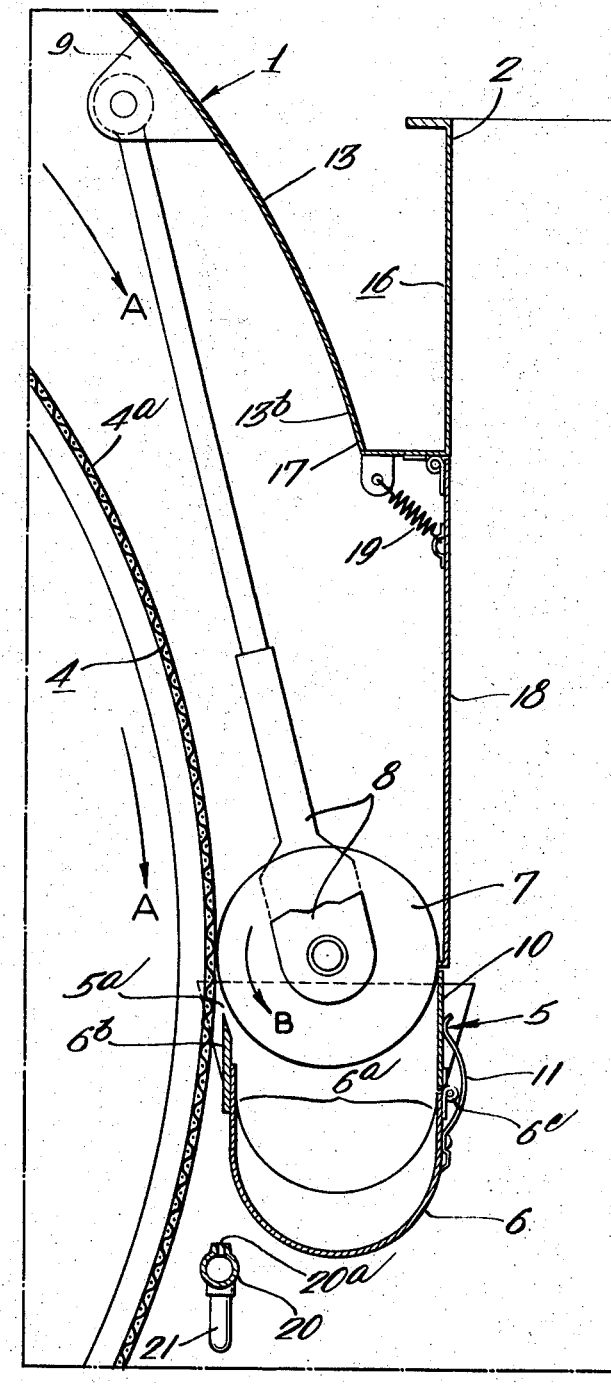

FILTERING APPARATUS FOR GASEOUS MEDIA

The present invention relates to filtering apparatus in which a cylindrical filter drum is rotated within a housing so that the dirt-laden gaseous media flows inwardly through the cylindrical surface of the drum and the foreign material is deposited on the outer surface of the drum, and in which a suction nozzle is provided adjacent the surface to remove the foreign material.

Filtering apparatus of this general type has had particular application in the textile industry for separation of fibrous nonsticky dust. Such dust is deposited on the filter surface without penetrating and adhering in the filter material proper, and it is therefore readily possible to suck the foreign material from the filter surface when it passes the suction gap of the suction nozzle. However, such filtering apparatus is often shut down because of the fibrous dust wedging between the suction nozzle and the rotating filter surface, stalling the drum.

Elimination of such shutdowns is accomplished by the present invention wherein a fixed suction nozzle is provided by a U-shaped element having a large longitudinal opening which is closed substantially by a rotatable roll which is biased against the filter surface and forms a suction gap between the roll and the edge of the U-shaped element facing the filter surface.

In the preferred embodiment of the invention, the casing of the apparatus is volute, comprising a helical wall and two substantially plane sidewalls, the inlet for the gaseous medium being located at the outer end of the helical wall, and the outlet being located in one of the sidewalls. Because of this design, the dirt-laden gaseous medium does not flow past any quiescent portions, so that foreign matter, such as fiber dust, is prevented from accumulating within the casing. This is essential, because certain types of fiber, for example cellulose fibers, gradually become discolored, and if such fibers remain within the casing they may deteriorate the quality of the product removed from the filter drum by a sporadic admixture of discolored fibers to the faultless fibers. By reason of the aforedescribed design of the casing, all of the fibers carried by the gaseous medium are sucked off through the suction gap of the suction nozzle.

In certain applications, the foreign matter separated from the gaseous medium contains in addition to fibers also lime, particularly where cellulose fibers are separated from mechanical pulpmills in which lime is added to improve the quality. During the separation of such foreign matter, coats of lime dust are normally formed on the filter surface, and the conventional suction nozzle is not capable of removing these coats. In accordance with a preferred embodiment of the invention, blow nozzles are connected to a compressed gas pipe and are mounted behind the suction nozzle, reckoned in the direction of rotation of the filter drum so as to blow jets of gas substantially tangentially against the filter surface toward the suction nozzle, to assist the separation of the dust from the filter surface.

Since the thickness of the layer of foreign material on the filter surface in advance of the suction nozzle is dependent upon the rotational speed of the filter drum, control means may be provided to adjust the rotational speed of the filter drum in response to the pressure drop of the gaseous medium during its passage through the filter surface, so as to maintain during varying operating conditions, optimum dust separation and suction conditions.

The invention is described in greater detail hereinafter with reference to the accompanying drawings which illustrate a suitable embodiment of filtering apparatus in accordance with the present invention.

FIG. 1 is a schematic cross section of such filtering apparatus;

FIG. 2 is a section along the line 2-2 of FIG. 1; and

FIG. 3 is an enlarged sectional view illustrating the details of the suction and blow nozzles in accordance with the present invention.

Referring to the drawing, the volute casing 1 of the filtering apparatus has an inlet 2 and an outlet 3 (see FIG. 2). The casing 1 encloses a rotatably mounted filter drum 4 provided with a cylindrical filter surface 4a, and having one end 4b closed and its opposite end 4c (see FIG. 2) open and connected with the outlet 3 of the casing to afford flow of the gaseous medium radially transversely through the filter surface 4a from the outside inwardly to the outlet 3. A suction nozzle 5 communicating with a suction pipe 12 is mounted in the casing 1 parallel with and adjacent to the filter surface 4a for removing foreign material from the filter surface during rotation of the filter drum. The suction nozzle 5 is provided with a suction gap 5a directed toward the filter surface 4a.

In accordance with the invention, the suction nozzle 5 is a U-shaped element 6 having a large longitudinal opening 6a (see FIG. 3), which is substantially closed by a rotatable roll 7 which is mounted for radial movement relative to the filter drum and bears against the filter surface 4a. In the illustrated embodiment, the bearing force is produced by the weight of the rotatable roll 7 which is pivotally suspended in the casing by means of hinged arms 8 journaled in bearings 9 fixed in the casing 1. The suction gap 5a of the nozzle is formed in accordance with the invention between the rotatable roll 7 and the near edge 6b of the U-shaped passage element 6 which faces the filter surface 4a. At the far edge 6c of the element, a plate 10 is pivotally mounted on the element 6 and is biased by a spring 11 into sealing abutment with the rotatable roll 7. In this manner, radial displacement of the roll 7 relative to the filter drum 4 varies the size of the suction gap 5a.

In the illustrated embodiment, the casing 1 of the filtering apparatus is volute, comprising a helical wall 13 and two substantially plane sidewalls 14 (see FIG. 2) and 15. The inlet 2 for the gaseous medium comprises a rectangular socket 16 which is mounted with a wall 16a (see FIG. 1) forming an extension of the helical wall 13 at the outer end 13a thereof. The outlet 3 is located in the sidewall 14 (see FIG. 2). The other end 15b of the helical wall 13 forms a corner 17 with the socket 16, and a plate 18 is hinged to the corner and is pressed by a spring 19 into abutment with the rotatable roll 7, thereby directing the dust-laden gas circumferentially about the filter drum 4 in the direction A before it passes through the filter surface 4a. The filter drum rotates in the same direction A, while the roll 7 rotates in the opposite direction B (see FIG. 3). Thus the roll 7 bears against the dirt-laden filter surface 4a immediately in advance of the suction gap 5a.

Behind the suction gap 5a, as seen in the direction of rotation A of the filter drum 4, blow nozzles 20 are mounted for cleaning the filter surface 4a. The blow nozzles 20 are connected to compressed gas pipes 21 and have blow openings 20a directed toward the suction gap 5a of the suction nozzle so as to blow gas jets substantially tangentially to the filter surface 4a in the direction of the suction nozzle 5.

The speed of rotation of the filter drum is automatically adjusted (by control means not shown) in relation to the pressure drop of the gaseous medium during its passage through the filter surface 4a.

Although a particular embodiment of the present invention has been herein illustrated and described, it is apparent that other embodiments may be made in accordance with the present invention.

I claim:

1. In apparatus for filtering foreign matter from a flowing gaseous medium, including a casing of generally circular cross section having a tangential inlet in the peripheral wall and an outlet opening in an end wall spaced from said inlet opening; a hollow drum mounted for rotation in said casing, said drum having an open end disposed in registry with said outlet opening and having a peripheral cylindrical filter surface, means permitting forward gas flow radially inwardly therethrough from the inlet and to the outlet for causing foreign matter to become deposited on the outwardly facing filter surface; means for rotating said drum; means providing a suction nozzle means fixedly mounted in said casing adjacent said inlet, said suction nozzle means comprising a U-shaped channel element having a near wall adjacent said filter surface, and a far wall remote from said filter surface and confronting said inlet opening; a roller extending into said U-shaped element and cooperable with said near wall to provide a gap therebetween adjacent the periphery of said drum; means pivotally connected to said casing and rotatably mounting said roller to bear against said cylindrical filter surface and permitting said roller to move toward and away from said drum and thereby to vary said gap; a plate having one end margin pivotally connected to said casing, adjacent said tangential inlet and having another end margin biased into engagement with said roller at a location remote from said gap, said plate being imperforate and being substantially coextensive with said roller so as to direct the incoming gas flow circumferentially around said cylindrical surface of the drum; and a second plate pivotally mounted on said far wall of said suction nozzle means remote from said gap and extending substantially coextensively along said roller and toward said first-mentioned plate and biased into engagement with said roller to prevent unfiltered gaseous medium from being drawn into the suction nozzle means except through said suction gap.

2. Apparatus according to claim 1 including means providing a series of discharge nozzles mounted in said casing to direct a flow of gas substantially tangentially to said drum and into said gap between said drum and the near wall of said suction nozzle for loosening strongly adherent foreign matter from the drum for removal by the suction nozzle means.

3. Apparatus according to claim 1 wherein said casing is volute and has a helical wall with an inner end spaced from said drum and an outer end spaced from said drum a distance greater than the inner end, said inlet opening comprising a socket positioned between said inner and outer ends which forms with said inner end a corner, said first mentioned plate being hinged to said casing at said corner, said apparatus including spring means for biasing each of said plates against said roller to afford freedom for movement of said roller to and from said near wall.